United States Patent
Masuda (10) Patent No.: US 11,831,625 B2
(45) Date of Patent: Nov. 28, 2023

(54) GATEWAY APPARATUS, COMMUNICATION METHOD, AND RECORDING MEDIUM

(71) Applicant: Panasonic Intellectual Property Management Co., Ltd., Osaka (JP)

(72) Inventor: Yoichi Masuda, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 192 days.

(21) Appl. No.: 17/119,976

(22) Filed: Dec. 11, 2020

(65) Prior Publication Data

US 2021/0185024 A1 Jun. 17, 2021

(30) Foreign Application Priority Data

Dec. 11, 2019 (JP) .................................. 2019-223889

(51) Int. Cl.
*H04L 29/06* (2006.01)
*H04L 9/40* (2022.01)

(52) U.S. Cl.
CPC ...... *H04L 63/0471* (2013.01); *H04L 63/0209* (2013.01); *H04L 63/06* (2013.01); *H04L 63/08* (2013.01)

(58) Field of Classification Search
CPC ..... H04L 63/08; H04L 63/06; H04L 63/0471; H04L 63/0209
See application file for complete search history.

(56) References Cited

U.S. PATENT DOCUMENTS

| 2004/0221049 | A1* | 11/2004 | Blumenau | H04L 63/101 707/999.1 |
| 2006/0133392 | A1* | 6/2006 | Ajitomi | H04L 12/2803 370/401 |
| 2007/0113269 | A1* | 5/2007 | Zhang | H04W 12/069 726/4 |
| 2009/0055531 | A1* | 2/2009 | Brown | H04L 63/20 709/224 |
| 2009/0094164 | A1* | 4/2009 | Fontaine | H04L 63/107 705/67 |

(Continued)

FOREIGN PATENT DOCUMENTS

JP 3794689 B2 7/2006
JP 2014-107637 A 6/2014

*Primary Examiner* — Dao Q Ho
(74) *Attorney, Agent, or Firm* — McDermott Will & Emery LLP (57) ABSTRACT

An identification code (referred to as "original identification code") in a predetermined application is preset in each of one or more devices not compliant to a predetermined security protocol. A GW determines a new identification code of each of the one or more devices and notifies an HEMS controller of the new identification code. The GW receives a message including the new identification code of a particular device (referred to as "destination device") and encrypted according to the security protocol. The GW decodes a received message according to the security protocol, converts the new identification code of the destination device included in a decoded message into the original identification code of the destination device, and transfers a converted message to the destination device.

4 Claims, 7 Drawing Sheets

(56) References Cited

U.S. PATENT DOCUMENTS

| | | | |
|---|---|---|---|
| 2010/0023603 A1* | 1/2010 | Archer | H04L 67/303 |
| | | | 709/225 |
| 2013/0067536 A1* | 3/2013 | Takahashi | H04L 63/08 |
| | | | 726/3 |
| 2016/0192277 A1* | 6/2016 | Starsinic | H04W 8/20 |
| | | | 370/329 |
| 2016/0277413 A1* | 9/2016 | Ajitomi | G06F 21/6209 |
| 2021/0185024 A1* | 6/2021 | Masuda | H04L 63/0209 |

* cited by examiner

| DEVICE NAME | IP ADDRESS | ORIGINAL IDENTIFICATION CODE | NEW IDENTIFICATION CODE |
|---|---|---|---|
| DEVICE 18a | AAA.BBB.CCC.1 | 0xAAAA01 | 0xAAAA01 |
| DEVICE 18b | AAA.BBB.CCC.2 | 0xAAAA01 | 0xAAAA02 |
| DEVICE 18c | AAA.BBB.CCC.3 | 0xAAAA01 | 0xAAAA03 |

| SESSION ID | KEY DATA | IP ADDRESS |
|---|---|---|
| L0001 | 0x11111ABC····1 | AAA. BBB. CCC. 1 |
| L0002 | 0x11111ABC····2 | AAA. BBB. CCC. 2 |
| L0003 | 0x11111ABC····3 | AAA. BBB. CCC. 3 |

54

GATEWAY APPARATUS, COMMUNICATION METHOD, AND RECORDING MEDIUM

BACKGROUND

1. Technical Field

The disclosure relates to communication technology and, more particularly, to a gateway apparatus, a communication method, and a recording medium.

2. Description of the Related Art

It is envisaged that home energy management systems (HEMS) for managing energy used at home will be used popularly. When an HEMS controller managing an HEMS successfully authenticates a device requesting participation in the HEMS, the HEMS controller permits participation of the device in the HEMS (see, for example, patent literature 1).
[Patent literature 1] JP2014-107637

When a new security scheme is introduced in a system like an HEMS, devices compliant to the new security scheme and non-compliant devices may coexist for the time being. In this case, the security risk is increased. For example, the system may be exposed to an attack that uses a device not compliant to the new security scheme as a springboard.

SUMMARY

The disclosure addresses the above-described issue, and one purpose thereof is to provide a technology of reducing the security risk in a system in which devices compliant to a predetermined security protocol and non-compliant devices coexist.

A gateway apparatus according to an embodiment of the present disclosure is adapted to mediate communication between a first device compliant to a predetermined security protocol and one or more second devices not compliant to the security protocol, an identification code in a predetermined application being preset in each of the one or more second devices, and the apparatus includes: a determination unit that determines a new identification code in the application for each of the one or more second devices; a storage unit that maps an original identification code of each of the one or more second devices to the new identification code and stores the original identification code and the new identification code accordingly; a notification unit that notifies the first device of the new identification code of each of the one or more second devices; a first reception unit that receives a message transmitted from the first device, the message including the new identification code of a particular second device and encrypted according to the security protocol; a first conversion unit that decodes the message received by the first reception unit according to the security protocol and converts the new identification code of the particular second device included in a decoded message into the original identification code of the particular second device; and a first transfer unit that transfers data based on the message converted by the first conversion unit to the particular second device.

Another embodiment of the present disclosure also relates to a gateway apparatus. The gateway apparatus is adapted to mediate communication between a first device compliant to a predetermined security protocol and one or more second devices not compliant to the security protocol, an identifi- cation code in a predetermined application being preset in each of the one or more second devices, and the apparatus includes: an authentication processing unit that is authenticated by the first device based on information on each of the one or more second devices to acquire one or more keys used for encrypted communication based on the security protocol and corresponding to each of the one or more second devices; a notification unit that notifies the first device of the identification code of each of the one or more second devices; a reception unit that receives a message transmitted from the first device, the message including the identification code of a particular second device and encrypted according to the security protocol; and a transfer unit that decodes the message received by the reception unit by using the key corresponding to the particular second device and transfers data based on a decoded message to the particular second device.

Another embodiment of the present disclosure relates to a communication method. The method is executed by a gateway apparatus adapted to mediate communication between a first device compliant to a predetermined security protocol and one or more second devices not compliant to the security protocol, an identification code in a predetermined application being preset in each of the one or more second devices, and the method includes: determining a new identification code in the application for each of the one or more second devices; mapping an original identification code of each of the one or more second devices to the new identification code and storing the original identification code and the new identification code accordingly; notifying the first device of the new identification code of each of the one or more second devices; receiving a message transmitted from the first device, the message including the new identification code of a particular second device and encrypted according to the security protocol; decoding a received message according to the security protocol and converting the new identification code of the particular second device included in a decoded message into the original identification code of the particular second device; and transferring data based on a converted message to the particular second device.

Another embodiment of the present disclosure also relates to a communication method. The method is executed by a gateway apparatus adapted to mediate communication between a first device compliant to a predetermined security protocol and one or more second devices not compliant to the security protocol, an identification code in a predetermined application being preset in each of the one or more second devices, and the method includes: being authenticated by the first device based on information on each of the one or more second devices to acquire one or more keys used for encrypted communication based on the security protocol and corresponding to each of the one or more second devices; notifying the first device of the identification code of each of the one or more second devices; receiving a message transmitted from the first device, the message including the identification code of a particular second device and encrypted according to the security protocol; and decoding a received message by using the key corresponding to the particular second device and transferring data based on a decoded message to the particular second device.

Optional combinations of the aforementioned constituting elements, and implementations of the present disclosure in the form of systems, computer programs, recording mediums recording computer programs, etc. may also be practiced as additional modes of the disclosure.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

The disclosure will now be described by reference to the preferred embodiments. This does not intend to limit the scope of the disclosure, but to exemplify the disclosure.

The device or the entity that executes the method according to the disclosure is provided with a computer. By causing the computer to run a program, the function of the device or the entity that executes the method according to the disclosure is realized. The computer is comprised of a processor that operates in accordance with the program as a main hardware feature. The disclosure is non-limiting as to the type of the processor so long as the function is realized by running the program. The processor is comprised of one or a plurality of electronic circuits including a semiconductor integrated circuit (IC) or a large-scale integration (LSI). The terms IC and LSI may change depending on the integration degree, and the processor may be comprised of a system LSI, a very large scale integration (VLSI), or an ultra large scale integration (USLI). A field programmable gate array (FPGA), which is programmed after an LSI is manufactured, or a reconfigurable logic device, in which connections inside the LSI can be reconfigured or circuit compartments inside the LSI can be set up, can be used for the same purpose. The plurality of electronic circuits may be integrated in one chip or provided in a plurality of chips. The plurality of chips may be aggregated in one device or provided in a plurality of devices. The program is recorded in a non-transitory recording medium such as a computer-readable ROM, optical disk, and hard disk drive. The program may be stored in a recording medium in advance or supplied to a recording medium via a wide area communication network including the Internet.

First Embodiment

Figure 1:
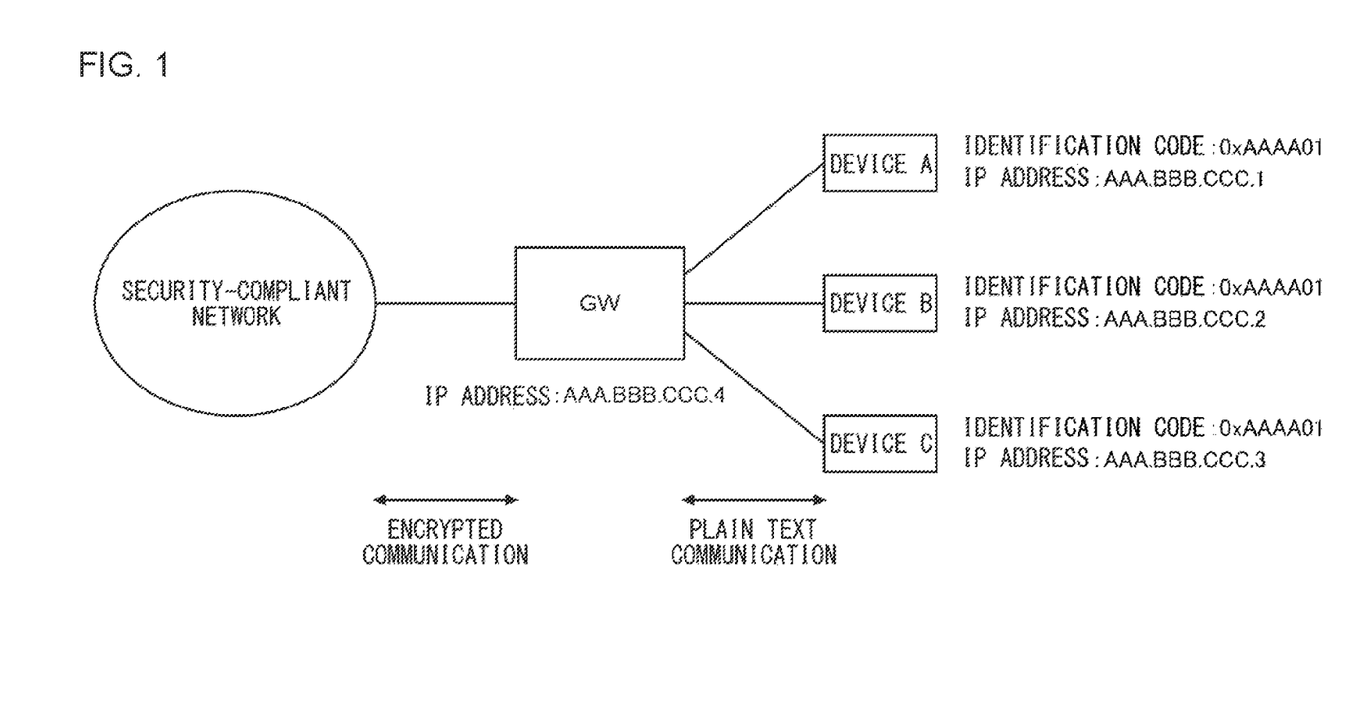
FIG. 1 shows an example of a communication system.

FIG. 1 shows an example of a communication system. A security-compliant network is defined as a network comprised of devices that are compliant to a predetermined security protocol. The predetermined security protocol is exemplified by secure sockets layer (SSL)/transport layer security (TLS). In a security-compliant network, encrypted communication (e.g., TLS communication) compliant to the security protocol is performed.

A device A, a device B, and a device C of FIG. 1 are devices not compliant to the above security protocol (also referred to as "legacy devices"). In order to connect the legacy devices to the security-compliant network, it is conceivable to place one or more legacy devices under the control of a gateway apparatus (hereinafter, referred to as "GW") that is compliant to the security protocol. The GW decodes an encrypted message transmitted from a device in the security-compliant network and transmits a decoded plain text message to the legacy device. Further, the GW encrypts a plain text message transmitted from the legacy device and transmits the encrypted message to the device in the security-compliant network.

In the case the device A, the device B, and the device C are of the same type (e.g., air conditioner), the security-compliant network may not be able to identify the devices A, B, and C on an application level. The application is exemplified by ECHONET (registered trademark) or ECHONETLite (registered trademark), which are protocols for HEMS. In the example of FIG. 1, the device A, the device B, and the device C are of the same type, and the same value "0xAAAA01" is set as an identification code in a predetermined application. An identification code is set in the device when the device is manufactured or shipped (e.g., stored in a built-in ROM). In ECHONETLite, the identification code is referred to as an ECHONET object code.

An application in the security-compliant network identifies individual devices by referring to a combination of the IP address and the identification code. In the example of FIG. 1, however, it appears to the application in the security-compliant network that the device A, the device B, and the device C under the control of the GW have the same IP address (the IP address of the GW) and the same identification code "0xAAA01". For this reason, the application in the security-compliant network cannot identify the device A, the device B, and the device C individually and control the device A, the device B, and the device C individually.

In this background, a technology, adapted for a system that connects one or more legacy devices to a security-compliant network via a GW and configured to make it possible to identify individual legacy devices under the control of the GW from an application in the security-compliant network, is proposed.

Figure 2:
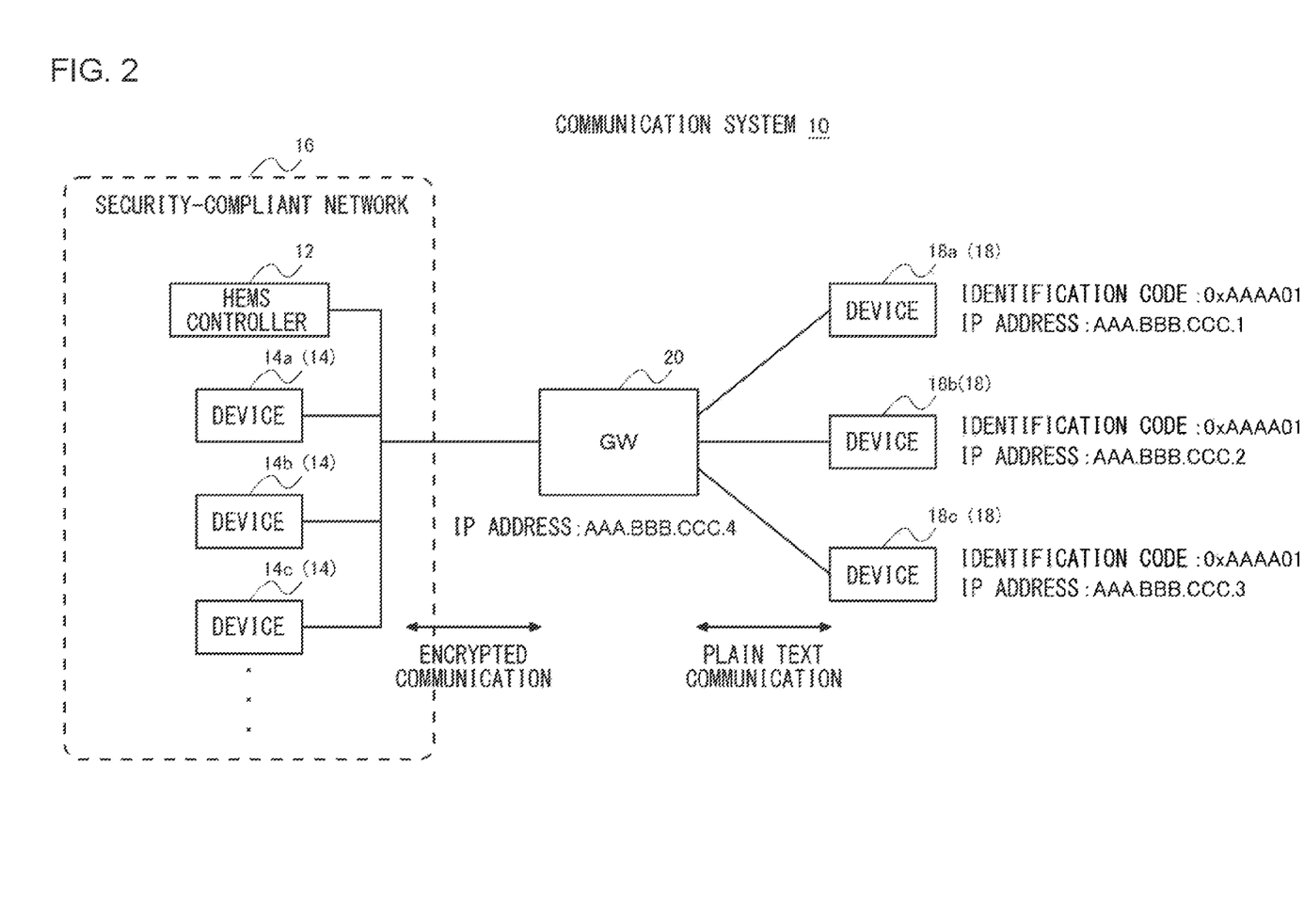
FIG. 2 shows a configuration of a communication system according to the first embodiment.

FIG. 2 shows a configuration of a communication system 10 according to the first embodiment. The HEMS controller 12 is an information processing device for managing the HEMS and transmitting and receiving messages to and from devices participating in the HEMS. The HEMS controller 12 is compliant to a predetermined security protocol (e.g., SSL/TLS). A device 14a, a device 14b, and a device 14c (generically referred to as "devices 14") are devices (e.g., refrigerator, lighting equipment, smartmeter) participating in the HEMS and compliant to the above security protocol. The HEMS controller 12 and the devices 14 perform encrypted communication according to the above security protocol and form a security-compliant network 16.

The device 18a, the device 18b, and the device 18c (generically referred to as "devices 18") are legacy devices not compliant to the above security protocol and are, for example, devices not compliant to SSL/TLS communication. The GW 20 is a gateway apparatus that houses one or more legacy devices. In the first embodiment, the GW 20 mediates communication between the devices 18 and the HEMS controller 12. As described with reference to FIG. 1, the GW 20 decodes an encrypted message transmitted from the HEMS controller 12 and transmits a decoded plain text message to the device 18. Further, the GW 20 encrypts a plain text message transmitted from the device 18 and transmits the encrypted message to the HEMS controller 12.

Figure 3:
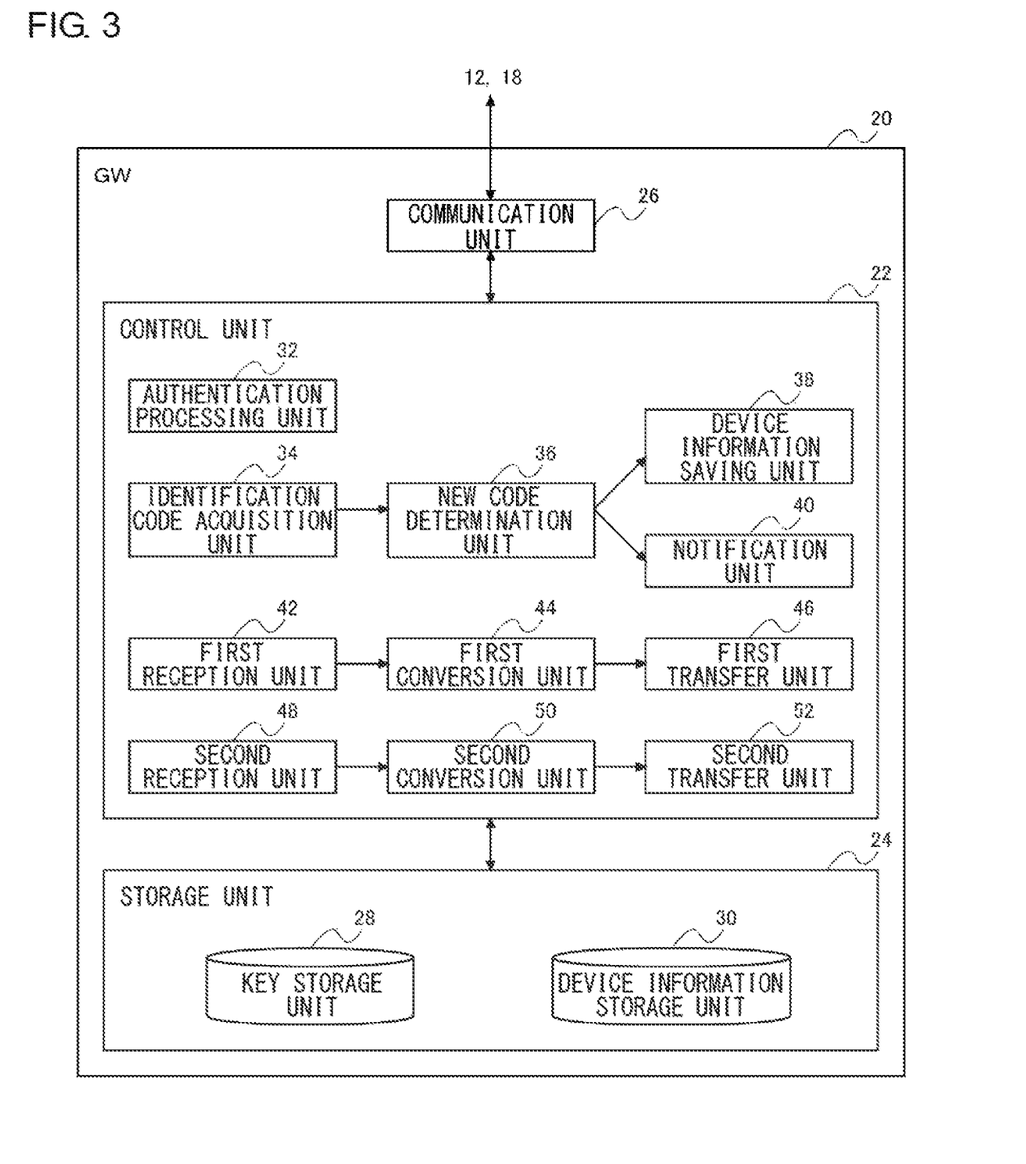
FIG. 3 is a block diagram showing functional blocks of the GW according to the first embodiment.

FIG. 3 is a block diagram showing functional blocks of the GW 20 according to the first embodiment. The blocks depicted in the block diagram of this disclosure are implemented in hardware such as devices and mechanical apparatus exemplified by a CPU and a memory of a computer, and in software such as a computer program. FIG. 3 depicts functional blocks implemented by the cooperation of these elements. Therefore, it will be obvious to those skilled in the art that the functional blocks may be implemented in a variety of manners by a combination of hardware and software.

The GW 20 includes a control unit 22, a storage unit 24, and a communication unit 26. The control unit 22 performs various data processes for mediating communication between the HEMS controller 12 and the devices 18. The storage unit 24 stores data referred to or updated by the control unit 22. The communication unit 26 performs encrypted communication with the HEMS controller 12 according to the predetermined security protocol that the devices in the security-compliant network 16 should comply to. The communication unit 26 performs plain-text communication with the devices 18. The control unit 22 transmits and receives data to and from the HEMS controller 12 and the devices 18 via the communication unit 26.

The storage unit 24 includes a key storage unit 28 and a device information storage unit 30. The key storage unit 28 stores data for a key (common key) for encrypted communication between the GW 20 and the HEMS controller 12 based on the security protocol. The device information storage unit 30 stores information (also referred to as "device information" hereinafter) related to the devices 18 for which the GW 20 mediates communication.

Figure 4:
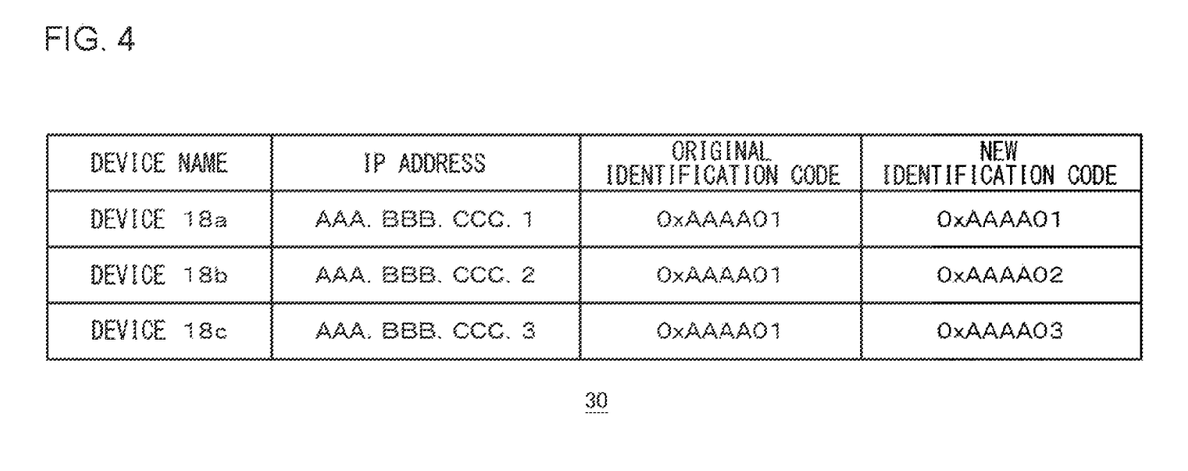
FIG. 4 shows an example of device information stored in the device information storage unit.

FIG. 4 shows an example of device information stored in the device information storage unit 30. In the "device name" field, the name (or a serial number, etc.) of each of plurality of devices 18 is stored. In the "IP address" field, the IP address of each of the plurality of devices 18 is stored. In the "original identification code" field, the original identification code (e.g., the identification code set when the device is manufactured or shipped) set for each of the plurality of devices 18 in advance is stored. In the "new identification code" field, the new identification code assigned by the new code determination unit 36 described later to each of the plurality of devices 18 is stored.

Referring back to FIG. 3, the control unit 22 includes an authentication processing unit 32, an identification code acquisition unit 34, a new code determination unit 36, a device information saving unit 38, a notification unit 40, a first reception unit 42, a first conversion unit 44, a first transfer unit 46, a second reception unit 48, a second conversion unit 50, and a second transfer unit 52. A computer program in which the functions of a plurality of these functional blocks are implemented (e.g., a gateway program) may be stored in a recording medium and installed in the storage unit 24 of the GW 20 via the recording medium. Alternatively, the above-mentioned computer program may be installed in the storage unit 24 via a communication network. The CPU of the GW 20 may exhibit the functions of the respective functional blocks by reading the above-mentioned computer program into the main memory.

The authentication processing unit 32 uses a publicly known method to perform mutual authentication with the HEMS controller 12 and exchanges a key for encrypted communication. The authentication processing unit 32 stores data for the key thus acquired in the key storage unit 28.

The identification code acquisition unit 34 acquires the original identification code of each of the one or more devices 18 (the device 18a, the device 18b, and the device 18c in the embodiment) for which communication is mediated. For example, the identification code acquisition unit 34 may acquire the original identification codes preset in the respective devices and the IP addresses of the respective devices from data (e.g., instance list notifications in ECHONETLite) transmitted from the device 18a, the device 18b, and the device 18c, respectively.

The new code determination unit 36 determines new identification codes of the respective one or more devices 18 for which communication is mediated (hereinafter, also referred to as "new identification codes") in accordance with a rule determined by the application in the security-compliant network 16. The new code determination unit 36 according to the first embodiment assigns mutually different new identification codes to the device 18a, the device 18b, and the device 18c, respectively. For example, the new identification code has a format in compliance with a code system defined in ECHONETLite.

As shown in FIG. 4, the device information saving unit 38 stores, in the device information storage unit 30, device information that maps the device name, the IP address, the original identification code, and the new identification code for each of the devices 18a-18c.

The notification unit 40 notifies the HEMS controller 12 of the new identification code assigned to each of the one or more devices 18 for which communication is mediated. For example, the notification unit 40 transmits, to the HEMS controller 12, an instance list notification that maps the IP address of the GW 20 itself (AAA.BBB.CCC.4) to the new identification code (0xAAAA01, 0xAAAA02, 0xAAAA03) of each of the device 18a, the device 18b, and the device 18c housed by the GW 20. The instance list notification may be encrypted by the key stored in the key storage unit 28.

The first reception unit 42 communicates with the HEMS controller 12 according to the security protocol to receive a message (hereinafter, also referred to as a "controller message") transmitted from the HEMS controller 12 and destined to the device 18 under the control of the GW 20. The controller message includes the new identification code of the destination device 18 and is encrypted according to the security protocol. For example, the first reception unit 42 receives the encrypted data for the controller message via a TLS session established between the HEMS controller 12 and the GW 20. The controller message may include a command that designates an operation of the device 18 (e.g., temperature control of an air conditioner).

The first conversion unit 44 decodes the controller message received by the first reception unit 42 according to the security protocol. More specifically, the first conversion unit 44 decodes the controller message by using the key stored in the key storage unit 28. Further, the first conversion unit 44 refers to the device information (e.g., the table of FIG. 4) in the device information storage unit 30 and converts the new identification code of the destination device 18 included in the decoded controller message into the original identification code of the device 18.

The first transfer unit 46 transfers data based on the controller message converted by the first conversion unit 44 to the destination device 18. In the embodiment, the first transfer unit 46 transmits the controller message converted by the first conversion unit 44 to the destination device 18, maintaining the message as a plain text.

In a variation, the device 18 may be compliant to the second security protocol less strong than the first security protocol that encrypted communication between the HEMS controller 12 and the GW 20 should comply to. In this case, the first conversion unit 44 may encrypt the controller message subjected to identification code conversion according to the second security protocol. The first transfer unit 46 may transmit the controller message encrypted according to the second security protocol to the destination device 18.

The second reception unit 48 receives a plain text message (hereinafter, also referred to as "device message") transmitted from a particular device 18 (hereinafter, also referred to as "source device") and including the original identification code of the source device. The device message may include information related to the status of the source device (e.g., the temperature of an air conditioner currently set).

The second conversion unit 50 refers to the device information (e.g., the table of FIG. 4) in the device information storage unit 30 and converts the original identification code of the source device included in the device message received by the second reception unit 48 into the new identification code of the source device. Further, the second conversion unit 50 encrypts the device message thus converted according to the security protocol. More specifically, the second conversion unit 50 encrypts the device message by using the key stored in the key storage unit 28.

The second transfer unit 52 communicates with the HEMS controller 12 according to the security protocol to transfer the device message encrypted by the second conversion unit 50 to the HEMS controller 12. For example, the second transfer unit 52 transmits encrypted data for the device message via a TLS session established between the HEMS controller 12 and the GW 20.

A description will now be given of an exemplary operation of the communication system 10 according to the first embodiment configured as described above. The authentication processing unit 32 of the GW 20 is authenticated by the HEMS controller 12 according to the security protocol at a point of time when the GW 20 should connect to the HEMS controller 12 (e.g., when the GW 20 is started or when connection is requested by the user in an instruction). The authentication processing unit 32 establishes a session with the HEMS controller 12 to acquire a key for encrypted communication. The authentication processing unit 32 stores the communication key thus acquired in the key storage unit 28.

Each of the device 18a, the device 18b, and the device 18c transmits an instance list notification that includes the device name, the IP address, the origination identification of the transmitting device to the GW 20 at a point of time when the device should connect to the HEMS controller 12 (e.g., when the device is started or when connection is requested by the user in an instruction). The identification code acquisition unit 34 of the GW 20 acquires the instance list notification transmitted from each of the device 18a, the device 18b, and the device 18c. The new code determination unit 36 of the GW 20 determines the new identification code of the source device transmitting the instance list notification. The device information saving unit 38 of the GW 20 stores, in the device information storage unit 30, device information that maps the device name, the IP address, the original identification code, and the new identification code of each of the device 18a, the device 18b, and the device 18c.

The notification unit 40 of the GW 20 transmits an instance list notification including the IP address of the GW 20 and the new identification code of the device housed in the GW 20 to the HEMS controller 12. The HEMS controller 12 registers, as the respective addresses of the device 18a, the device 18b, and the device 18c, (1) a combination of the IP address of the GW 20 and the new identification code of the device 18a, (2) a combination of the IP address of the GW 20 and the new identification code of the device 18b, and (3) a combination of the IP address of the GW 20 and the new identification code of the device 18c.

A description will now be given of the operation performed when a message is transmitted from the HEMS controller 12 to the device 18b. The HEMS controller 12 transmits, to the GW 20, a controller message including the IP address (AAA.BBB.CCC.4) of the GW 20, the new identification code (0xAAAA02) of the device 18b, and the command designating an operation of the device 18b, the controller message being encrypted by the key exchanged with the GW 20 in advance. The first reception unit 42 of the GW 20 receives the encrypted controller message.

The first conversion unit 44 of the GW 20 decodes the encrypted controller message by using the key exchanged with the HEMS controller 12 in advance. Since the identification code indicated by the decoded controller message is the new identification code of the device 18b, the first conversion unit 44 determines that the destination is the device 18b. The first conversion unit 44 converts the IP address of the controller message into the IP address of the device 18b (AAA.BBB.CCC.2) and converts the identification code in the controller message into the original identification code (0xAAAA01) of the device 18b.

The first transfer unit 46 of the GW 20 transmits the controller message converted by the first conversion unit 44 to the device 18b, maintaining the message as a plain text. The device 18b performs the operation designated by the HEMS controller 12 in accordance with the command indicated by the controller message.

A description will now be given of the operation performed when a message is transmitted from the device 18b to the HEMS controller 12. The device 18b transmits a device message including the IP address (AAA.BBB.CCC.2) of the device 18b, the original identification code (0xAAAA01) of the device 18b, and the information indicating the status of the device 18b to the GW 20, maintaining the message as a plain text. The second reception unit 48 of the GW 20 receives the plain text device message.

The second conversion unit 50 of the GW 20 converts the IP address in the device message into the IP address (AAA.BBB.CCC.4) of the GW 20 and converts the identification code in the device message into the new identification code (0xAAAA02) of the device 18b. The second conversion unit 50 encrypts the device message thus converted by using the communication key exchanged with the HEMS controller 12 in advance.

The second transfer unit 52 of the GW 20 transmits the device message encrypted by the second conversion unit 50 to the HEMS controller 12. The HEMS controller 12 decodes the device message transmitted from the GW 20 and updates the status of the device 18b in the database managed in the HEMS, based on the decoded device message.

The GW 20 according to the first embodiment mediates communication between the device 18 not compliant to a predetermined security protocol and the security-compliant network 16. This reduces the security risk and allows the device 18 to connect to the security-compliant network 16.

Further, the GW 20 according to the first embodiment assigns a unique new identification code to each device under the control of the GW 20, as an identification code in the HEMS application, and registers the new identification code of each device in the HEMS controller 12. This makes it possible to identify individual devices (e.g., the device 18*a*, the device 18*b*, and the device 18*c*) under the control of the GW 20 from the device (e.g., the HEMS controller 12) in the security-compliant network 16.

Second Embodiment

The features of the second embodiment different from those of the first embodiment will mainly be described below, and a description of the common features will be omitted. Those constituting elements of the second embodiment that are identical to or corresponding to the constituting elements of the first embodiment will be denoted by the same reference symbols in the description.

Figure 5:
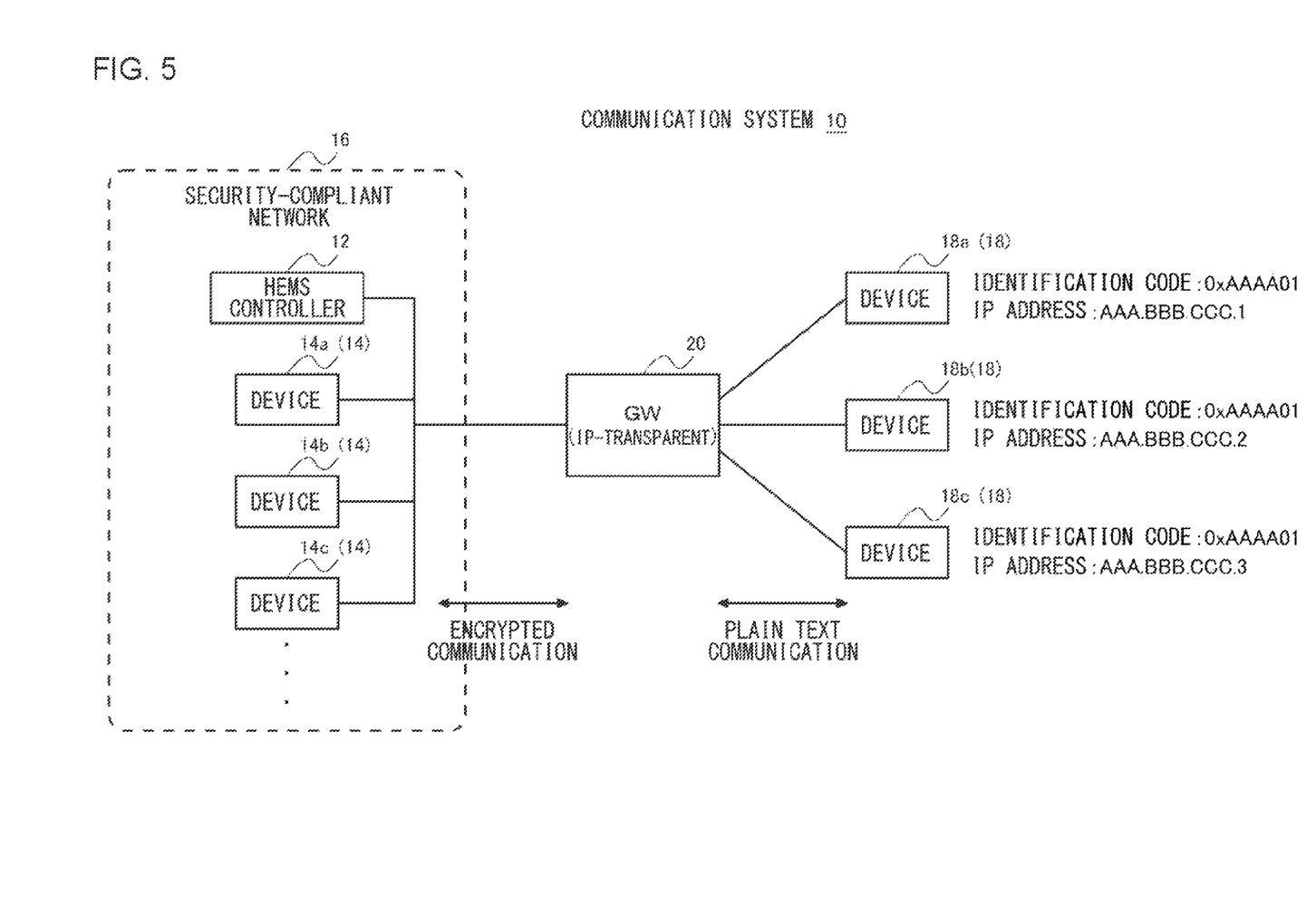
FIG. 5 shows a configuration of the communication system according to the second embodiment.

FIG. 5 shows a configuration of the communication system 10 according to the second embodiment. The GW 20 of the second embodiment differs from the GW 20 according to the first embodiment in that the GW 20 does not have an IP address and mediates communication in an IP-transparent fashion.

Figure 6:
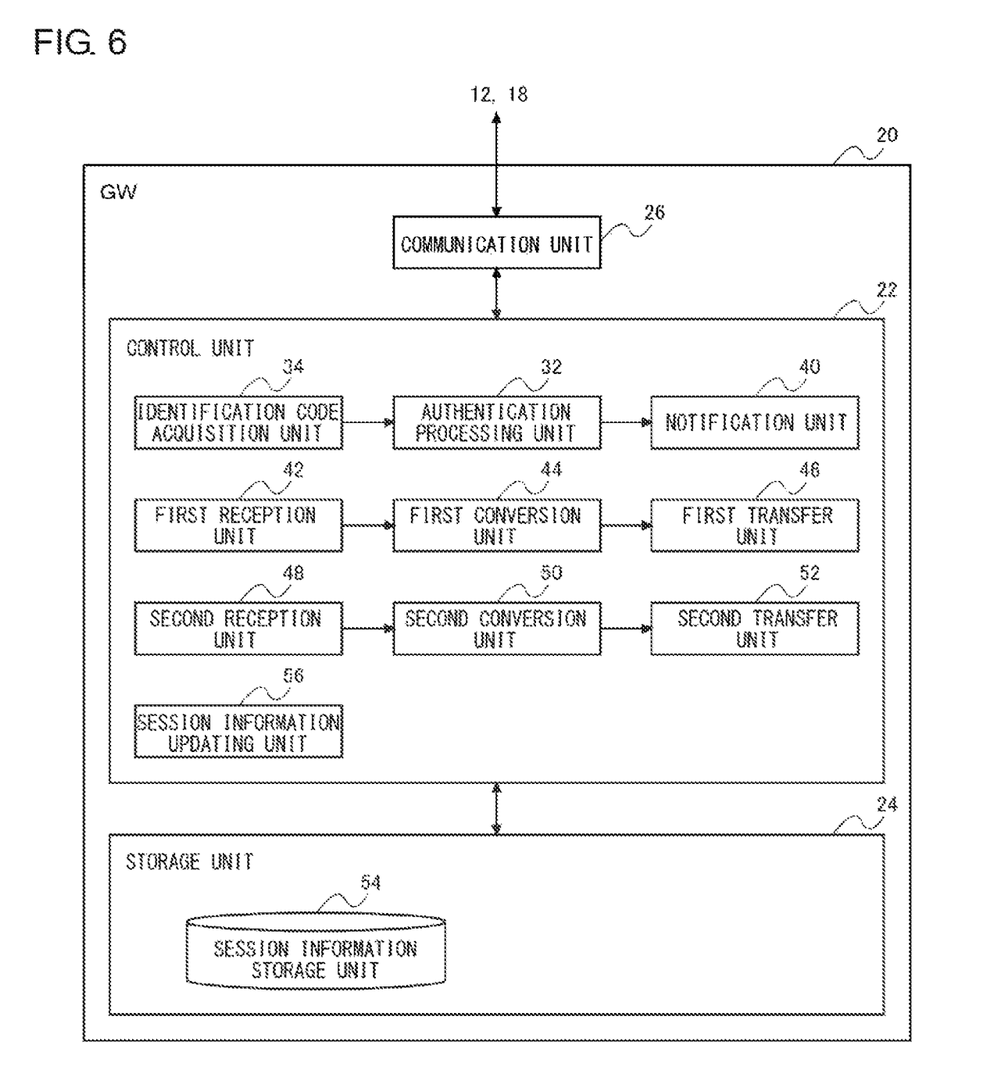
FIG. 6 is a block diagram showing functional blocks of the GW according to the second embodiment.

FIG. 6 is a block diagram showing functional blocks of the GW 20 according to the second embodiment. The GW 20 includes a session information storage unit 54, an identification code acquisition unit 34, an authentication processing unit 32, a notification unit 40, a first reception unit 42, a first conversion unit 44, a first transfer unit 46, a second reception unit 48, a second conversion unit 50, a second transfer unit 52, and a session information updating unit 56.

The GW 20 according to the second embodiment manages a session between the device 18*a* and the HEMS controller 12, a session between the device 18*b* and the HEMS controller 12, a session between the device 18*c* and the HEMS controller 12 individually. More specifically, the GW 20 and the HEMS controller 12 according to the second embodiment map a plurality of keys for encrypted communication corresponding to the device 18*a*, the device 18*b*, and the device 18*c*, respectively, to IDs (hereinafter, also referred to as "session IDs") on the security protocol and manage the keys and the IDs accordingly. The session information storage unit 54 stores session information related to each of the device 18*a*, the device 18*b*, and the device 18*c*. IEEE802.21 may be used as the security protocol. In this case, the ID on the security protocol may be MISFID and SAID.

Figure 7:
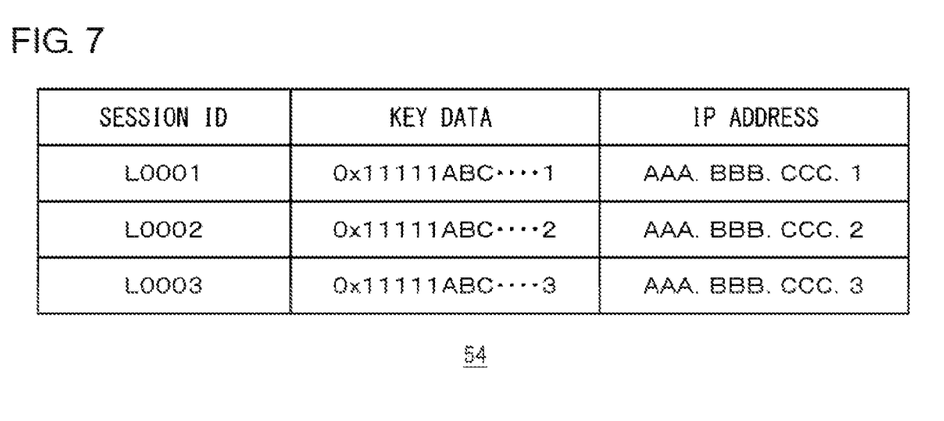
FIG. 7 shows an example of session information stored in the session information storage unit.

FIG. 7 shows an example of session information stored in the session information storage unit 54. The session information is data that maps, for each of the device 18*a*, the device 18*b*, and the device 18*c*, the session ID and the key corresponding to each device to the IP address of each device. As shown in FIG. 7, the session information storage unit 54 stores the correspondence between the IP address of each of the device 18*a*, the device 18*b*, and the device 18*c* and the session ID.

Referring back to FIG. 6, the identification code acquisition unit 34 acquires, from the data (e.g., the instance list notification in ECHONETLite) transmitted from each of the device 18*a*, the device 18*b*, and the device 18*c*, information including (1) the original identification code set in each device in advance and (2) the IP address of each device. The information may include other attribute information related to each device.

The authentication processing unit 32 communicates with the HEMS controller 12 to have each of the device 18*a*, the device 18*b*, and the device 18*c* authenticated by the HEMS controller 12, based on the information transmitted from each of the device 18*a*, the device 18*b*, and the device 18*c*. The authentication processing unit 32 acquires one or more keys corresponding to each of the device 18*a*, the device 18*b*, and the device 18*c* for encrypted communication based on the security protocol, by transmitting and receiving data to and from the HEMS controller 12 based on the security protocol. Stated otherwise, the authentication processing unit 32 establishes a communication session between the HEMS controller 12 and the device 18*a*, a communication session between the HEMS controller 12 and the device 18*b*, and a communication session between the HEMS controller 12 and the device 18*c*, by exchanging, with the HEMS controller 12, a key used for encrypted communication between the HEMS controller 12 and the device 18*a*, a key used for encrypted communication between the HEMS controller 12 and the device 18*b*, and a key used for encrypted communication between the HEMS controller 12 and the device 18*c*.

The authentication processing unit 32 further acquires, when acquiring the key corresponding to each of the device 18*a*, the device 18*b*, and the device 18*c*, a session ID corresponding to each of the device 18*a*, the device 18*b*, and the device 18*c* (i.e., corresponding to each key). As shown in FIG. 7, the authentication processing unit 32 stores, in the session information storage unit 54, session information that maps, for each of the device 18*a*-18*c*, the session ID, the key, and the IP address.

The notification unit 40 encrypts a message including the identification code (original identification code) of each of the device 18*a*, the device 18*b*, and the device 18*c* by the communication key corresponding to each device and notifies the HEMS controller 12 of the encrypted identification code. The notification unit 40 may encrypt the instance list notification transmitted from each of the device 18*a*, the device 18*b*, and the device 18*c* by the communication key corresponding to each device and transfer the encrypted instance list notification to the HEMS controller 12.

The first reception unit 42 communicates with the HEMS controller 12 according to the security protocol and receives a controller message transmitted from the HEMS controller 12 and destined to the device 18 under the control of the GW 20. The controller message includes the original identification code of the destination device 18 and is encrypted according to the security protocol.

The first conversion unit 44 decodes the controller message by using the key recorded in the session information (e.g., the table of FIG. 7) in the session information storage unit 54 and corresponding to the destination device 18. The first transfer unit 46 transfers the data based on the controller message decoded by the first conversion unit 44 to the destination device 18. In this embodiment, the first transfer unit 46 transmits the decoded controller message to the destination device 18, maintaining the message as a plain text.

The second reception unit 48 receives a device message in a plain text format transmitted from a particular device 18 (hereinafter, also referred to as "source device") and including the original identification code of the source device. The second conversion unit 50 encrypts the device message by using the key recorded in the session information (e.g., the table of FIG. 7) in the session information storage unit 54 and corresponding to the source device 18. The second transfer unit 52 transfers the device message encrypted by the second conversion unit 50 to the HEMS controller 12.

When the IP address of at least one of the plurality of devices 18 is changed, the session information updating unit 56 updates the session information (i.e., the correspondence between the IP address and the session ID) stored in the session information storage unit 54. For example, the session information updating unit 56 may monitor a communication network connected to the plurality of devices 18 and detect a packet (e.g., a dynamic host configuration protocol (DHCP) packet) relevant to the change of the IP address. The session information updating unit 56 may save (overwrite save) the new IP address of the particular device 18 indicated by the packet in the session information on the particular device 18.

A description will now be given of an exemplary operation of the communication system 10 according to the second embodiment configured as described above. Each of the device 18a, the device 18b, and the device 18c transmits an instance list notification that includes the device name, the IP address, the origination identification of the transmitting device to the GW 20 at a point of time when the device should connect to the HEMS controller 12 (e.g., when the device is started or when connection is requested by the user in an instruction). The identification code acquisition unit 34 of the GW 20 acquires the instance list notification transmitted from each of the device 18a, the device 18b, and the device 18c.

The authentication processing unit 32 of the GW 20 have each of the device 18a, the device 18b, and the device 18c authenticated by the HEMS controller 12, based on the instance list notification transmitted from each of the device 18a, the device 18b, and the device 18c. The authentication processing unit 32 establishes a session with the HEMS controller 12 corresponding to each of the device 18a, the device 18b, and the device 18c to acquire a session ID and a key corresponding to each of the device 18a, the device 18b, and the device 18c. The authentication processing unit 32 stores, in the session information storage unit 54, session information corresponding to each of the device 18a, the device 18b, and the device 18c and mapping the session ID, the key, and the IP address.

The notification unit 40 of the GW 20 transmits, to the HEMS controller 12, an instance list notification including the IP address of the device 18a and the original identification code of the device 18a and encrypted by using the key corresponding to the device 18a. The notification unit 40 also transmits, to the HEMS controller 12, an instance list notification including the IP address of the device 18b and the original identification code of the device 18b and encrypted by using the key corresponding to the device 18b. The notification unit 40 also transmits, to the HEMS controller 12, an instance list notification including the IP address of the device 18c and the original identification code of the device 18c and encrypted by using the key corresponding to the device 18c.

The HEMS controller 12 registers, as the addresses of the device 18a, the device 18b, and the device 18c, (1) a combination of the IP address of the device 18a and the original identification code of the device 18a, (2) a combination of the IP address of the device 18b and the original identification code of the device 18b, and (3) a combination of the IP address of the device 18c and the original identification code of the device 18c.

A description will now be given of the operation performed when a message is transmitted from the HEMS controller 12 to the device 18b. The HEMS controller 12 transmits, to the GW 20, a controller message including the IP address (AAA.BBB.CCC.2) of the device 18b, the original identification code (0xAAAA01) of the device 18b, and the command designating an operation of the device 18b, the controller message being encrypted by the key exchanged with the GW 20 in advance and corresponding to the device 18b. The first reception unit 42 of the GW 20 receives the encrypted controller message.

The first conversion unit 44 of the GW 20 identifies that the destination is the device 18b by referring to the IP address or the session ID in the controller message. The first conversion unit 44 decodes the encrypted controller message by using the key exchanged with the HEMS controller 12 in advance and corresponding to the device 18b. The first transfer unit 46 of the GW 20 transmits the controller message decoded by the first conversion unit 44 to the device 18b, maintaining the message as a plain text. The device 18b performs the operation designated by the HEMS controller 12 in accordance with the command indicated by the controller message.

A description will now be given of the operation performed when a message is transmitted from the device 18b to the HEMS controller 12. The device 18b transmits a device message including the IP address (AAA.BBB.CCC.2) of the device 18b, the original identification code (0xAAAA01) of the device 18b, and the information indicating the status of the device 18b to the GW 20, maintaining the message as a plain text. The second reception unit 48 of the GW 20 receives the plain text device message.

The second conversion unit 50 of the GW 20 encrypts the device message thus received by using the key corresponding to the device 18b. The second transfer unit 52 of the GW 20 transmits the encrypted device message to the HEMS controller 12. The HEMS controller 12 decodes the device message transmitted from the GW 20 and updates the status of the device 18b in the database managed in the HEMS, based on the decoded device message.

The HEMS controller 12 updates the key corresponding to the device 18 (at least one of the device 18a, the device 18b, and the device 18c) at a predetermined point of time and transmits the updated key to the GW 20 along with the session ID. The GW 20 changes the key mapped to the session ID in the session information in the session information storage unit 54 to the updated key. The session information updating unit 56 of the GW 20 detects that the IP address of the device 18 under the control of the GW 20 is changed by a method such as that of detecting a DHCP packet flowing in the communication network connected to the device 18 under the control of the GW 20. The session information updating unit 56 updates the correspondence between the IP address and the session ID in the session information.

Like the GW 20 according the first embodiment, the GW 20 according to the second embodiment mediates communication between the device 18 not compliant to the predetermined security protocol and the security-compliant network 16. This reduces the security risk and allows the device 18 to connect to the security-compliant network 16. Further, the GW 20 according to the second embodiment reflects a change of the IP address in a given device 18 in the session information. This makes it possible to maintain the correspondence between the device 18 and the key and continue communication between the HEMS controller 12 and the device, even if the IP address in the given device 18 is changed.

Given above is a description of the disclosure based on the first embodiment and the second embodiment. The embodiments is intended to be illustrative only and it will be understood by those skilled in the art that various modifications to constituting elements and processes could be developed and that such modifications are also within the scope of the present disclosure.

The GW 20 according to the first embodiment may further include a device information updating unit corresponding to the session information updating unit 56 according to the second embodiment. When the IP address of at least one of the plurality of devices 18 is changed, the device information updating unit may update the IP address of that device 18 stored in the device information storage unit 30. For example, the device information updating unit may monitor a communication network connected to the plurality of devices 18 and detect a packet (e.g., a DHCP packet) relevant to the change of the IP address. The device information updating unit may save (overwrite save) the new IP address of a particular device 18 indicated by the packet in the device information of the particular device 18. According to the GW 20 of this variation, it is possible to maintain the correspondence between the device and the new identification code and continue communication between the HEMS controller 12 and the device 18, even if the IP address of the given device 18 is changed.

Any combination of the embodiment and a variation will also be useful as an embodiment of the disclosure. A new embodiment created by a combination will provide the combined advantages of the embodiment and the variation as combined. It will be understood to a skilled person that the functions that the constituting elements recited in the claims should achieve are implemented either alone or in combination by the constituting elements shown in the embodiments and the variations.

The technologies according to the second embodiment and variations may be defined by the following items.

[Item 1] A gateway apparatus (20) adapted to mediate communication between a first device (12) compliant to a predetermined security protocol and one or more second devices (18) not compliant to the security protocol, an identification code in a predetermined application being preset in each of the one or more second devices (18), the apparatus comprising:
- a determination unit (36) that determines a new identification code in the application for each of the one or more second devices (18);
- a storage unit (30) that maps an original identification code of each of the one or more second devices (18) to the new identification code and stores the original identification code and the new identification code accordingly;
- a notification unit (40) that notifies the first device (12) of the new identification code of each of the one or more second devices (18);
- a first reception unit (42) that receives a message transmitted from the first device (12), the message including the new identification code of a particular second device (18) and encrypted according to the security protocol;
- a first conversion unit (44) that decodes the message received by the first reception unit (42) according to the security protocol and converts the new identification code of the particular second device (18) included in a decoded message into the original identification code of the particular second device (18); and
- a first transfer unit (46) that transfers data based on the message converted by the first conversion unit (44) to the particular second device (18).

[Item 2] The gateway apparatus according to item 1, further comprising:
- a second reception unit (48) that receives a message transmitted from the particular second device (18) and including the original identification code of the particular second device (18);
- a second conversion unit (50) that converts the original identification code of the particular second device (18) included in the message received by the second reception unit (48) into the new identification of the particular second device and encrypts a converted message according to the security protocol; and
- a second transfer unit (52) that transfers the message encrypted by the second conversion unit (50) to the first device (12).

[Item 3] A gateway apparatus (20) adapted to mediate communication between a first device (12) compliant to a predetermined security protocol and one or more second devices (18) not compliant to the security protocol, an identification code in a predetermined application being preset in each of the one or more second devices (18), the apparatus comprising:
- an authentication processing unit (32) that is authenticated by the first device (12) based on information on each of the one or more second devices (18) to acquire one or more keys used for encrypted communication based on the security protocol and corresponding to each of the one or more second devices (18);
- a notification unit (40) that encrypts the identification code of each of the one or more second devices (18) and notifies the first device (12) of an encrypted identification code;
- a reception unit (42) that receives a message transmitted from the first device (12), the message including the identification code of a particular second device (18) and encrypted according to the security protocol; and
- a transfer unit that decodes the message received by the reception unit by using the key corresponding to the particular second device and transfers data based on a decoded message to the particular second device.

[Item 4] The gateway apparatus (20) according to item 3, wherein the gateway apparatus (20) and the first device (12) map one or more keys respectively corresponding to the one or more second devices (18) to IDs on the security protocol and manage the keys and the IDs accordingly, the apparatus further comprising:
- a storage unit (54) that stores correspondence between respective addresses of the one or more second devices (18) and the IDs on the security protocol; and
- an updating unit that updates the correspondence stored in the storage unit (54) when the address of at least one of the second devices (18) is changed.

[Item 5] A communication method executed by a gateway apparatus (20) adapted to mediate communication between a first device (12) compliant to a predetermined security protocol and one or more second devices (18) not compliant to the security protocol, an identification code in a predetermined application being preset in each of the one or more second devices (18), the method comprising:
- determining a new identification code in the application for each of the one or more second devices (18);
- mapping an original identification code of each of the one or more second devices (18) to the new identification code and storing the original identification code and the new identification code accordingly;

notifying the first device (12) of the new identification code of each of the one or more second devices (18);

receiving a message transmitted from the first device (12), the message including the new identification code of a particular second device (18) and encrypted according to the security protocol;

decoding a received message according to the security protocol and converting the new identification code of the particular second device (18) included in a decoded message into the original identification code of the particular second device (18); and transferring data based on a converted message to the particular second device (18).

[Item 6] A communication method executed by a gateway apparatus (20) adapted to mediate communication between a first device (12) compliant to a predetermined security protocol and one or more second devices (18) not compliant to the security protocol, an identification code in a predetermined application being preset in each of the one or more second devices (18), the method comprising:

being authenticated by the first device (12) based on information on each of the one or more second devices (18) to acquire one or more keys used for encrypted communication based on the security protocol and corresponding to each of the one or more second devices (18);

notifying the first device (12) of the identification code of each of the one or more second devices (18);

receiving a message transmitted from the first device (12), the message including the identification code of a particular second device (18) and encrypted according to the security protocol; and decoding a received message by using the key corresponding to the particular second device (18) and transferring data based on a decoded message to the particular second device (18).

[Item 7] A computer program executed by a gateway apparatus (20) adapted to mediate communication between a first device (12) compliant to a predetermined security protocol and one or more second devices (18) not compliant to the security protocol, an identification code in a predetermined application being preset in each of the one or more second devices (18), the computer program including modules implemented by the gateway apparatus (20), the modules comprising:

a module that determines a new identification code in the application for each of the one or more second devices (18);

a module that maps an original identification code of each of the one or more second devices (18) to the new identification code and stores the original identification code and the new identification code accordingly;

a module that notifies the first device (12) of the new identification code of each of the one or more second devices (18);

a module that receives a message transmitted from the first device (12), the message including the new identification code of a particular second device (18) and encrypted according to the security protocol;

a module that decodes a received message according to the security protocol and converts the new identification code of the particular second device (18) included in a decoded message into the original identification code of the particular second device (18); and a module that transfers data based on a converted message to the particular second device (18).

[Item 8] A computer program executed by a gateway apparatus adapted to mediate communication between a first device (12) compliant to a predetermined security protocol and one or more second devices (18) not compliant to the security protocol, an identification code in a predetermined application being preset in each of the one or more second devices (18), the computer program including modules implemented by the gateway apparatus, the modules comprising:

a module that is authenticated by the first device (12) based on information on each of the one or more second devices (18) to acquire one or more keys used for encrypted communication based on the security protocol and corresponding to each of the one or more second devices (18);

a module that encrypts the identification code of each of the one or more second devices (18) and notifies the first device (12) of an encrypted identification code;

a module that receives a message transmitted from the first device (12), the message including the identification code of a particular second device (12) and encrypted according to the security protocol; and a module that decodes a received message by using the key corresponding to the particular second device (18) and transfers data based on a decoded message to the particular second device (18).

What is claimed is:

1. A gateway apparatus comprising:

a processor coupled to a memory;

the processor adapted to mediate communication between (1) a first device compliant to a security protocol and (2) second and third devices not compliant to the security protocol, the second device having a first preset code and the third device having a second preset code, the first preset code having a value that is a same as that of the second preset code;

the processor configured to generate a first identification code for the second device and a second identification code for the third device, the first and second identification codes being different from each other; and storage that stores the first identification code associated with the first preset code, and the second identification code associated with the second preset code, wherein the processor is further configured to:

notify the first device of the first and second identification codes of the second and third devices;

receive a message transmitted from the first device, the message including the first identification code of the second device and encrypted according to the security protocol;

decode the received message according to the security protocol and replace the first identification code in the decoded message with the first preset code associated with the first identification code; and transfer the decoded message to the second device.

2. The gateway apparatus according to claim 1, wherein the processor is further configured to:

receive a message transmitted from the second device, the message including the first preset code of the second device;

replace the first preset code in the message with the first identification code associated with the first preset code and encrypt the message according to the security protocol; and transfer the encrypted message to the first device.

3. A communication method executed by, a processor of a gateway apparatus, adapted to mediate communication between (1) a first device compliant to a security protocol and (2) second and third devices not compliant to the security protocol, the second device having a first preset code and the third device having a second preset code, the first preset code having a value that is a same as that of the second preset code, the method comprising:
- generating a first identification code for the second device and a second identification code for the third device, the first and second identification codes being different from each other;
- storing the first identification code associated with the first preset code, and the second identification code associated with the second preset code;
- notifying the first device of the first and second identification codes of the second and third devices;
- receiving a message transmitted from the first device, the message including the first identification code of the second device and encrypted according to the security protocol;
- decoding the received message according to the security protocol and replacing the first identification code in the decoded message with the first preset code associated with the first identification code; and
- transferring the converted message to the particular second device.

4. A non-transitory computer-readable recording medium encoded with a computer program for a processor of a gateway apparatus adapted to mediate communication between (1) a first device compliant to a security protocol and (2) second and third devices not compliant to the security protocol, the second device having a first preset code and the third device having a second preset code, the first preset code having a value that is a same as that of the second preset code, the computer program, when executed, causing the processor of the gateway apparatus to:
- generate a first identification code for the second device and a second identification code for the third device, the first and second identification codes being different from each other;
- store the first identification code associated with the first preset code, and the second identification code associated with the second preset code;
- notify the first device of the first and second identification codes of the second and third devices;
- receive a message transmitted from the first device, the message including the first identification code of the second device and encrypted according to the security protocol;
- decode the received message according to the security protocol and replace the first identification code in the decoded message with the first preset code associated with the first identification code; and
- transfer the converted message to the second device.

* * * * *